J. E. MacMILLAN.
BELT HOLDER.
APPLICATION FILED JULY 6, 1920.

1,389,206.

Patented Aug. 30, 1921.

Joseph E. MacMillan
Inventor

UNITED STATES PATENT OFFICE.

JOSEPH E. MacMILLAN, OF PASADENA, CALIFORNIA.

BELT-HOLDER.

1,389,206. Specification of Letters Patent. Patented Aug. 30, 1921.

Application filed July 6, 1920. Serial No. 394,151.

*To all whom it may concern:*

Be it known that I, JOSEPH E. MACMILLAN, a citizen of the United States, residing in the city of Pasadena, county of Los Angeles, and State of California, have invented certain new and useful Improvements in Belt-Holders, of which the following is a specification.

My invention relates to belt holders, and more particularly to a device designed to catch and hold a belt or similar flexible driving element when it accidentally jumps from its wheel or pulley. It is quite common in motorcycles for the belt which operates the generator to jump from the pulleys and be lost and the operator is put to great inconvenience for the reason that it usually happens at night and the generator is put out of commission and the lighting system is rendered inoperative. The object of my invention is to provide a device which can be quickly applied to motorcycles in use, at small expense, and which will prevent the loss of the driving belt for the generator.

In order to illustrate my invention, I have shown it in the accompanying drawings, in which,—

Figure 1:
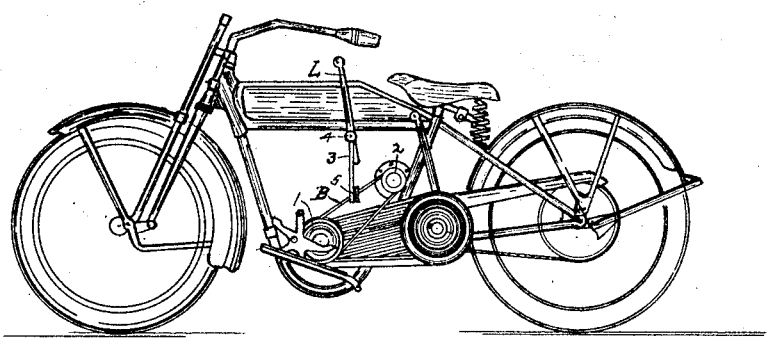
Figure 2:
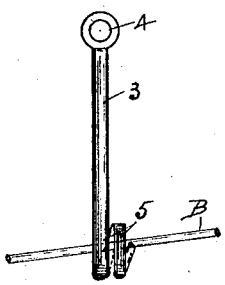

Figure 1 is a side elevation of a motorcycle, with engine omitted, showing the application of my invention thereto; and Fig. 2 is a view of the invention detached.

Instead of undertaking to prevent the belt from jumping from the driving pulleys, 1 and 2, I provide means for catching and holding the belt when it does jump from its pulleys. The device comprises a body member 3, provided at its upper end with means for attaching it to some part of the machine. I have shown it provided with an eye, 4, adapted to receive the pivot bolt of the lever L, although it is to be understood that the device can be attached in any desirable or convenient place and in any manner suitable for holding it. The lower end of my device, as here shown, is provided with a loop, 5, through which the belt can run freely and without wear or friction. I have shown an open loop, or coil, whereby to facilitate the easy application of the device to the belt, B. It will be understood, however, that any loop or eye can be provided for the belt to run through and which will catch and hold the belt or driving element when it accidentally jumps from its driving members. Thus I have provided a practical, simple and inexpensive device which can be applied to motorcycles, or other machines, to prevent the loss of the flexible driving element should it jump from its driving pulleys or wheels. I do not limit the invention to the exact form thereof here shown for illustrative purposes, except as I may be limited by the hereto appended claims.

I claim:

1. In combination with a motorcycle generator belt, of a member provided with a loop through which said belt freely runs, and means for holding said member between the driving pulleys for said belt, whereby to catch and hold said belt when it jumps from said pulleys, substantially as described.

2. In combination with a motorcycle generator belt, of a member provided at one end with means for attaching it to the motorcycle, and at its opposite end with a loop adapted to be placed around one lap of said belt, for the purpose referred to.

Signed at Pasadena, Los Angeles county, California, this 1st day of July, 1920.

JOSEPH E. MacMILLAN.

In presence of—
T. PARK UPTON,
W. R. LITZENBERG.